US011840949B2

United States Patent
Koike et al.

(10) Patent No.: US 11,840,949 B2
(45) Date of Patent: Dec. 12, 2023

(54) EXHAUST GAS PURIFICATION FILTER

(71) Applicant: DENSO CORPORATION, Kariya (JP)

(72) Inventors: Kazuhiko Koike, Nisshin (JP); Keisuke Mizutani, Nisshin (JP); Kana Asaoku, Kariya (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 17/487,254

(22) Filed: Sep. 28, 2021

(65) Prior Publication Data
US 2022/0018273 A1    Jan. 20, 2022

Related U.S. Application Data

(63) Continuation of application No. PCT/JP2020/006216, filed on Feb. 18, 2020.

(30) Foreign Application Priority Data

Mar. 29, 2019 (JP) .................. 2019-068771

(51) Int. Cl.
*F01N 3/022* (2006.01)
*B01D 53/94* (2006.01)
(Continued)

(52) U.S. Cl.
CPC ....... *F01N 3/0222* (2013.01); *B01D 39/2068* (2013.01); *B01D 46/2429* (2013.01);
(Continued)

(58) Field of Classification Search
CPC ............ F01N 3/0222; B01D 46/24491; B01D 46/24492; B01D 39/2068; B01D 46/2429; B01D 53/94; B01J 35/04
(Continued)

(56) References Cited

U.S. PATENT DOCUMENTS

2003/0039598 A1* 2/2003 Nishimura ............ F01N 3/0222
422/177
2003/0041574 A1    3/2003 Noguchi et al.
(Continued)

OTHER PUBLICATIONS

International Search Report dated Apr. 7, 2020 issued for International Application No. PCT/JP2020/006216 (2 pages).

*Primary Examiner* — Robert A Hopkins
*Assistant Examiner* — Qianping He
(74) *Attorney, Agent, or Firm* — Nixon & Vanderhye P.C.

(57) ABSTRACT

An exhaust gas purification filter includes a honeycomb structure part and sealing parts. The honeycomb structure part has a porous partition wall and a plurality of cells defined by the partition wall to form exhaust gas flow paths. The sealing parts seal alternately a gas inflow-side end face or a gas outflow-side end face of the cells. The exhaust gas purification filter includes fine pores with diameters of 10 μm or less measured by the mercury intrusion method that account for 5% or more of all pores by volume in the honeycomb structure part. The partition wall has a plurality of communication pores communicating between the cells adjacent to the partition wall and has constricted communication pore of which a largest diameter $\Phi_1$ and a smallest diameter $\Phi_2$ satisfy relationships $\Phi_1 \geq 50$, $100 \times \Phi_2/\Phi_1 \leq 20$.

1 Claim, 15 Drawing Sheets

(51) Int. Cl.
  *B01D 39/20* (2006.01)
  *B01D 46/24* (2006.01)
  *B01J 35/04* (2006.01)

(52) U.S. Cl.
  CPC . *B01D 46/24491* (2021.08); *B01D 46/24492* (2021.08); *B01D 53/94* (2013.01); *B01J 35/04* (2013.01)

(58) Field of Classification Search
  USPC .......................................................... 55/529
  See application file for complete search history.

(56) References Cited

U.S. PATENT DOCUMENTS

| | | |
|---|---|---|
| 2004/0161596 A1 | 8/2004 | Taoka et al. |
| 2006/0037297 A1 | 2/2006 | Hijikata |
| 2006/0107641 A1 | 5/2006 | Kasai et al. |
| 2007/0163117 A1 | 7/2007 | Nishimura et al. |
| 2010/0011726 A1 | 1/2010 | Ishikawa |
| 2011/0135873 A1* | 6/2011 | Okazaki ............. B01D 46/2474 428/116 |
| 2011/0203242 A1 | 8/2011 | Goto et al. |
| 2013/0062275 A1 | 3/2013 | Kobashi et al. |
| 2013/0243999 A1 | 9/2013 | Hirose et al. |
| 2014/0165519 A1 | 6/2014 | Miyairi |
| 2014/0165520 A1 | 6/2014 | Miyairi |
| 2014/0208706 A1* | 7/2014 | Kobashi ................ C04B 35/478 55/529 |

* cited by examiner

PROPORTION OF FINE PORES WITH DIAMETERS 10 μm OR LESS IS 5% BY VOLUME

US 11,840,949 B2

EXHAUST GAS PURIFICATION FILTER

CROSS-REFERENCE TO RELATED APPLICATION

The present application is a continuation application of International Application No. PCT/JP2020/006216 filed on Feb. 18, 2020, which claims priority to Japanese Patent Application No. 2019-068771 filed on Mar. 29, 2019. The contents of these applications are incorporated herein by reference in their entirety.

BACKGROUND

The present invention relates to an exhaust gas purification filter that is capable of collecting a particle matter discharged from an internal combustion engine.

Exhaust gases discharged from internal combustion engines such as diesel engines and gasoline engines, and thermal engines such as boilers contain a particle matter called particulate. Hereinafter, such particulate will be called "PM" as appropriate. Exhaust gas purification filters are used to collect the PM in the exhaust gases.

An exhaust gas purification filter generally includes a honeycomb structure part that has a plurality of cells defined by porous partition wall and sealing parts that seal adjacent cells alternately.

SUMMARY

An aspect of the present disclosure relates to an exhaust gas purification filter including: a honeycomb structure part that has a porous partition wall and a plurality of cells; and a sealing part, wherein the exhaust gas purification filter includes fine pores that account for 5% or more of all pores by volume in the honeycomb structure part, and the partition wall has a plurality of communication pores that has a constricted communication pore of which a largest diameter $\Phi 1$ (μm) and a smallest diameter $\Phi 2$ (μm) satisfy relationships $\Phi 1 \geq 50$, $100 \times \Phi 2/\Phi 1 \leq 20$.

The reference signs in parentheses described in the claims indicate the correspondence with the specific units of the embodiments described later, and are not intended to limit the technical scope of the present disclosure.

BRIEF DESCRIPTION OF THE DRAWINGS

The above-mentioned and other objectives, features, and advantages of the present disclosure will be become more clearly by the detailed description below with reference to the accompanying drawings. The drawings are as follows.

DETAILED DESCRIPTION OF THE PREFERRED EMBODIMENTS

Figure 1:
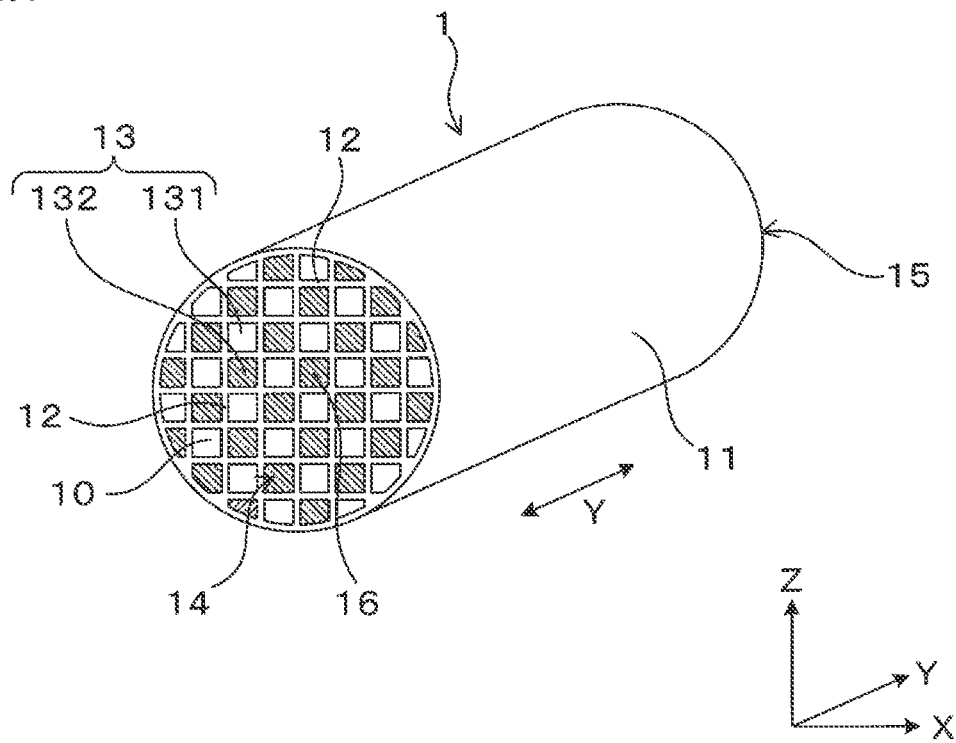
FIG. 1 is a perspective view of an exhaust gas purification filter in a first embodiment.

A exhaust gas purification filter is required to collect the PM from the exhaust gas into pores in the partition wall and enhance the rate of collecting the PM while reducing a loss of pressure. Hereinafter, the rate of collecting the PM will be called "collection efficiency" as appropriate, and the loss of pressure will be called "pressure loss" as appropriate.

Enhancing the porosity of the partition wall is effective in reducing the pressure loss. However, enhancing the porosity tends to lower the collection efficiency.

JP 4094830 B discloses a technique for, in the pore diameter distribution of a filter, setting the volume of pores with diameters of 10 to 50 μm to 75% or more to reduce the volume of pores with diameters of 10 μm or less or diameters of 50 μm or more. According to JP 4094830 B, employing the above-described configuration allows high-efficiency collection of PM reduced in diameter due to the improvement of diesel engines.

JP 4473693 B discloses a technique for setting the average pore diameter difference ratio represented as {(A–B)/B}× 100 to 35% or less where A denotes the average pore diameter (μm) measured by the mercury intrusion method and B denotes the average pore diameter (μm) measured by the bubble point method, setting the average pore diameter B to 15 to 30 μm, and setting the largest pore diameter measured by the bubble point method to 150 μm. According to JP 4473693 B, employing the above-described configuration allows high-efficiency collection of PM reduced in diameter due to the improvement of diesel engines.

Fine PM of small diameters are likely to undergo Brownian motion, and the proportion of PM with Brownian motion is high in the exhaust gas containing a large amount of fine PM. As a result, the PM is collected in pores more predominantly through the collision of the PM with the pore walls due to its Brownian motion than through the inertial collision of the PM with the pore walls due to gas flowing. Therefore, it is considered that the PM can be collected with high efficiency by adjusting the pore diameter distribution as disclosed in JP 4094830 B.

However, at the startup of the engine, for example, its exhaust gas contains many soluble organic fractions, and the PM in the exhaust gas is large in diameter. The coarse PM with large diameters is unlikely to undergo Brownian motion, and thus the collection of the coarse PM through the inertial collision with the pore walls due to gas flowing is predominant. Further, the exhaust temperature is low at the startup of the engine, which causes a decrease in the PM with Brownian motion and makes the collection through inertial collision predominant.

According to the technique described in JP 4094830 B, the probability of inertial collision becomes low to decrease the efficiency of collecting the coarse PM. This results in a reduction in the rate of collecting the PM. According to the technique described in JP 4473693 B, the largest pore diameter measured by the bubble point method is 150 μm or less, and thus the narrowest portion of communication pores in the partition wall is 150 μm or less. That is, the partition wall has large communication pores with the narrowest portion of 100 μm, for example, and the coarse PM may easily pass through the large communication pores depending on the shape of the communication pores. This decreases the rate of collecting the coarse PM, thereby leading to a reduction in the rate of collecting the entire PM. Raising the proportion of fine pores in all pores of the partition wall by volume would increase the probability of inertial collision and improve the efficiency of collecting the coarse PM, but would also bring about a significant increase in pressure loss.

The present disclosure is intended to provide an exhaust gas purification filter with a high collection efficiency and a low pressure loss.

An aspect of the present disclosure relates to an exhaust gas purification filter including: a honeycomb structure part that has a porous partition wall and a plurality of cells defined by the partition wall to form an exhaust gas flow path; and a sealing part that seals alternately a gas inflow-side end face or a gas outflow-side end face of the cells, wherein the exhaust gas purification filter includes fine pores with diameters of 10 μm or less measured by the mercury intrusion method that account for 5% or more of all pores by volume in the honeycomb structure part, and the partition wall has a plurality of communication pores communicating between the cells adjacent to the partition wall and has a constricted communication pore of which a largest diameter $\Phi 1$ (μm) and a smallest diameter $\Phi 2$ (μm) satisfy relationships $\Phi 1 \leq 50$, $100 \times \Phi 2/\Phi 1 \leq 20$.

In the exhaust gas purification filter, the fine pores with diameters of μm or less account for 5% or more of all the pores by volume. That is, the fine pores capable of collecting the coarse PM through inertial collision form a high proportion. As a result, the exhaust gas purification filter has a higher probability of collecting the coarse PM through inertial collision so that the coarse PM can be sufficiently collected in the fine pores.

The exhaust gas purification filter further has the constricted communication pore. The constricted communication pore has the largest diameter $\Phi_1$ (μm) and smallest diameter $\Phi_2$ (μm) satisfying the relationships $\Phi_1 \geq 50$, $100 \times \Phi_2/\Phi_1 \leq 20$. The exhaust gas tends to intensively flow into the communication pores with the largest diameter $\Phi_1$ of 50 μm or more, which generally lowers the probability of inertial collision. However, the constricted communication pore has a portion with the smallest diameter satisfying the relationship $100 \times \Phi_2/\Phi_1 \leq 20$ (hereinafter, called "constricted portion" as appropriate), which increases the probability of inertial collision. As a result, the constricted communication pore enhances the efficiency of collecting the coarse PM. Furthermore, the constricted communication pore has an exhaust gas flow path narrowed by the constricted portion with the smallest diameter $\Phi_2$ (μm), which suppresses the exhaust gas from intensively flowing into the constricted communication pore even with the largest diameter $\Phi_1$ of 50 μm or more. Accordingly, the flow of gas is distributed into other pores such as fine pores with higher efficiency of collecting the PM. This allows higher-efficiency collection of the PM, thereby increasing the rate of collecting the PM.

In the exhaust gas purification filter, not only the pores likely to increase the pressure loss are increased but also the large pores are used to improve the efficiency of collecting the PM, thereby suppressing an increase in pressure loss. That is, it is possible to sufficiently raise the rate of collecting the PM while suppressing an increase in pressure loss.

As described above, according to the foregoing aspect, it is possible to provide an exhaust gas purification filter with a high collection efficiency and a low pressure loss.

First Embodiment

Figure 2:
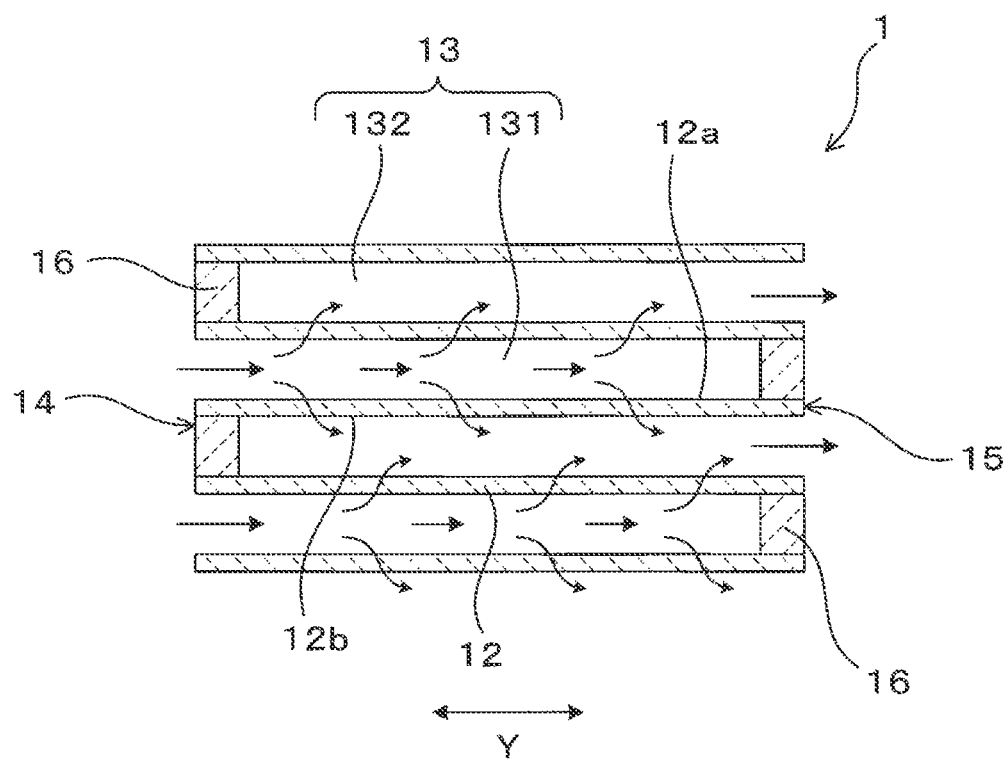
FIG. 2 is an enlarged partial cross-sectional view of the exhaust gas purification filter taken along an axial direction in the first embodiment.
Figure 3:
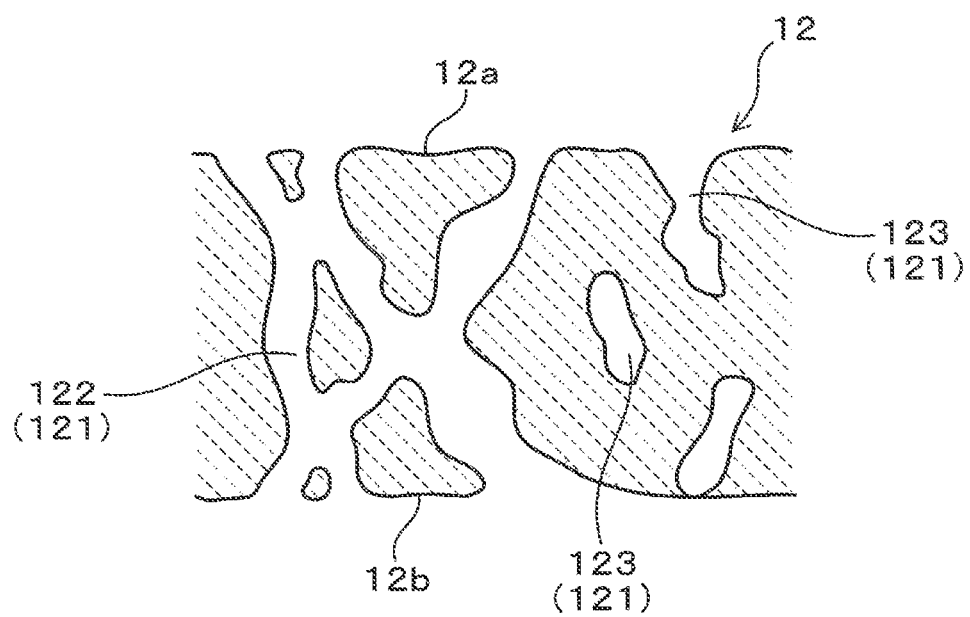
FIG. 3 is an enlarged schematic cross-sectional view of a partition wall in the exhaust gas purification filter in the first embodiment.

An embodiment of an exhaust gas purification filter will be described with reference to FIGS. 1 to 14. As illustrated in FIGS. 1 to 3, an exhaust gas purification filter 1 has a honeycomb structure part 10 and sealing parts 16. The honeycomb structure part 10 is formed from ceramic such as cordierite, and includes, for example, an outer case 11, a partition wall 12, and cells 13.

The outer case 11 is formed in a circular cylindrical shape, for example. In the following description of the present embodiment, an axial direction Y of the cylindrical outer case 11 is set as an axial direction Y of the exhaust gas purification filter 1. The arrows in FIG. 2 indicate the flows of an exhaust gas in the exhaust gas purification filter 1 that is arranged in an exhaust gas pathway such as an exhaust pipe.

As illustrated in FIGS. 1 and 2, the partition wall 12 divides the interior of the outer case 11 into a large number of cells. The partition wall 12 is also generally called a cell wall. The partition wall 12 is provided in a grid pattern, for example. The exhaust gas purification filter 1 has a porous structure that includes a large number of pores 121 in the partition wall 12 as illustrated in FIG. 3. Therefore, the exhaust gas purification filter 1 can accumulate and collect PM 2 contained in the exhaust gas, on the surface of the partition wall 12 and in the pores 121. The pores 121 may also be called air pores. The PM 2 is fine particles called particle matter substances, particulate matter, or particulates.

As the average diameter of pores in the porous partition wall 12 is made smaller, the rate of collecting the PM 2 can be more improved but the pressure loss becomes higher. From the viewpoint of achieving both the improvement in the rate of collecting the PM 2, in particular, coarse PM 22, and the suppression of pressure loss at a high level, it is preferable to adjust the average diameter of pores in the partition wall 12, for example, within a range of 15 μm or more and 22 μm or less. From the viewpoint of further enhancing this effect, the average pore diameter is more preferably 16 μm or more and 20 μm or less, further preferably 16 μm or more and 18 μm or less.

Increasing the porosity of the partition wall 12 would keep the pressure loss at a low level but would deteriorate the filter strength. In reverse, decreasing the porosity would raise the filter strength but would increase the pressure loss. The desired advantageous effect of the present disclosure could be obtained even with different porosities. However, in terms of striking a balance between the pressure loss and the filter strength at a high level, the porosity of the partition wall 12 is preferably adjusted, for example, within a range of 60% or more and 70% or less. In order to further enhance this advantageous effect, the porosity is more preferably 62% or more and 68% or less, further preferably 64% or more and 67% or less. The average pore diameter and porosity of the partition wall 12 are measured by the mercury intrusion method, and detailed measurement methods will be described below with reference to experimental examples.

The porous partition wall 12 has a pore diameter distribution and contains fine pores 124 with diameters of 10 μm or less that account for 5% or more of all the pores by volume. This allows the exhaust gas purification filter 1 to collect the PM 2 at a high collection efficiency. The pore diameter distribution and pore diameters are measured by the mercury intrusion method. The proportion of the fine pores 124 in all the pores by volume will be called as appropriate "proportion of the fine pores by volume".

As illustrated in FIGS. 1 and 2, the exhaust gas purification filter 1 has the large number of cells 13. The cells 13 are surrounded by the partition wall 12 to form exhaust flow paths. The extending direction of the cells 13 generally aligns with the axial direction Y.

As illustrated in FIG. 1, the cell shape is square, for example, in the filter cross section taken along a direction orthogonal to the axial direction Y, but the cell shape is not limited to this. The cell shape may be polygonal such as triangular, square, or hexagonal, or circular. Alternatively, the cell shape may be a combination of two or more different shapes.

The exhaust gas purification filter 1 has the shape of a column such as a circular cylinder, for example, and its dimensions may be changed as appropriate. The exhaust gas purification filter 1 has an inflow-side end face 14 and an outflow-side end face 15 at both ends seen in the axial direction Y. The inflow-side end face 14 is an end face on the side where the exhaust gas flows in, and the outflow-side end face 15 is an end face on the side where the exhaust gas flows out. When being not arranged in the flow of an exhaust gas in an exhaust pipe or the like, the inflow-side end face 14 and the outflow-side end face 15 refer to faces relative to each other. That is, if one end face is the inflow-side end face 14, the other end face is the outflow-side end face 15. For example, the inflow-side end face 14 can be called a first end face in the axial direction and the outflow-side end face 15 can be called a second end face in the axial direction.

The cells 13 may include first cells 131 and second cells 132. As illustrated in FIG. 2, the first cells 131 are opened at the inflow-side end face 14 and sealed by the sealing parts 16 at the outflow-side end face 15. The second cells 132 are opened at the outflow-side end face 15 and sealed by the sealing parts 16 at the inflow-side end face 14.

The sealing parts 16 seal alternately the inflow-side end face 14 and the outflow-side end face 15 of the cells. The sealing parts 16 may be formed from ceramic such as cordierite, for example, or may be formed from another material. Referring to FIG. 2, the sealing parts 16 are formed in a plug shape, but the shape of the sealing parts 16 is not particularly limited as far as the sealing parts 16 can seal the inflow-side end face 14 or the outflow-side end face 15. Although the corresponding configuration is not illustrated, the sealing parts 16 may be formed by, for example, partially deforming the partition wall 12 at the inflow-side end face 14 or the outflow-side end face 15. In this case, since the sealing parts 16 are formed from some parts of the partition wall 12, the partition wall 12 and the sealing parts 16 are formed integrally and continuously.

The first cells 131 and the second cells 132 are alternately arranged such that they are adjacent to each other, for example, both in a lateral direction orthogonal to the axial direction Y and in a vertical direction orthogonal to both the axial direction Y and the lateral direction. That is, when the inflow-side end face 14 or the outflow-side end face 15 of the exhaust gas purification filter 1 is seen from the axial direction Y, the first cells 131 and the second cells 132 are arranged, for example, in a check pattern.

The partition wall 12 partitions the first cell 131 and second cell 132 adjacent to each other as illustrated in FIG. 2. The partition wall 12 has the large number of pores 121 therein as illustrated in FIG. 3. The pores 121 in the partition wall 12 include communication pores 122 that allow communication between the first cell 131 and the second cell 132 adjacent to each other. FIG. 3 illustrates two-dimensionally one simplified communication pore 122, but most of the communication pores 122 are considered to intersect three-dimensionally.

Figure 4:
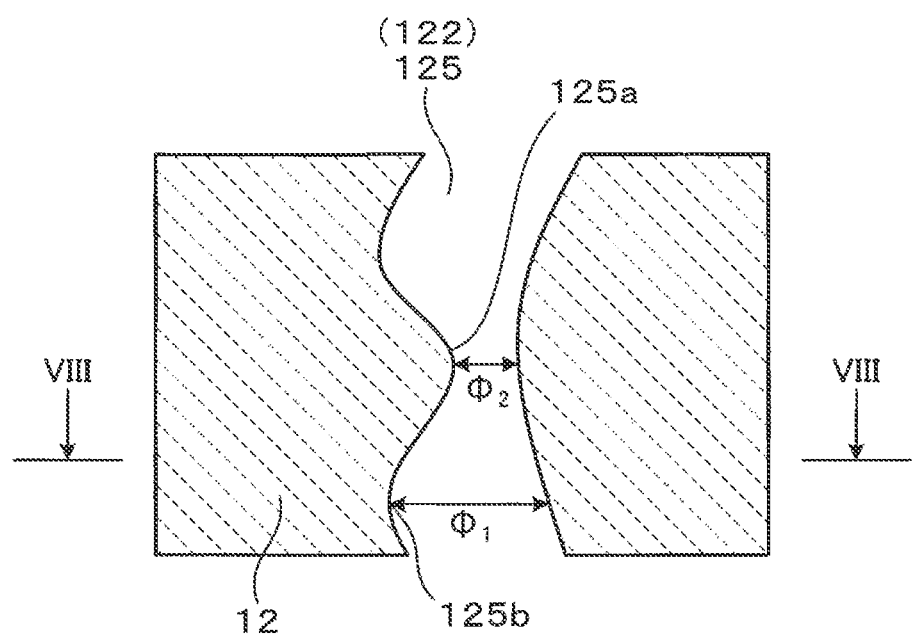
FIG. 4 is an enlarged schematic cross-sectional view of the partition wall, which illustrates an example of a simplified constricted communication pore in the first embodiment.

The partition wall 12 has constricted communication pores 125. FIG. 4 is an enlarged schematic cross-sectional view of the partition wall 12, illustrating one constricted communication pore 125 in a simplified manner.

FIG. 4 illustrates an example of a pore (specifically, the constricted communication pore 125) in the partition wall 12. In actuality, however, the partition wall 12 has a large number of pores in various shapes. The same thing applies to FIGS. 6 and 7. As illustrated in FIG. 4, the constricted communication pore 125 is a communication pore 122 of which a largest diameter $\Phi_1$ (μm) and a smallest diameter $\Phi_2$ (μm) satisfy the relationships $\Phi_1 \geq 50$, $100 \times \Phi_2/\Phi_1 \leq 20$. The communication pores 122 with the largest diameters $\Phi_1$ of less than 50 µm and the communication pores 122 with the smallest diameter $\Phi_2$/the largest diameter $\Phi_1$ being over 20 are not constricted communication pores 125. The partition wall 12 may have communication pores 122 other than the constricted communication pores 125 and may have non-communication pores 123 that do not communicate with the partition wall 12.

Since the honeycomb structure part 10 has the constricted communication pores 125 in the partition wall 12, it is possible to significantly enhance the rate of collecting the PM 2 while suppressing an increase in pressure loss even with the pores 124 being 5% or more in volume. That is, the exhaust gas purification filter 1 can achieve a high collection efficiency and a low pressure loss at a high level. In particular, the exhaust gas purification filter 1 can exhibit a high rate of collecting the coarse PM 22 while keeping a low pressure loss. This is possibly for the reason described below.

Figure 18:
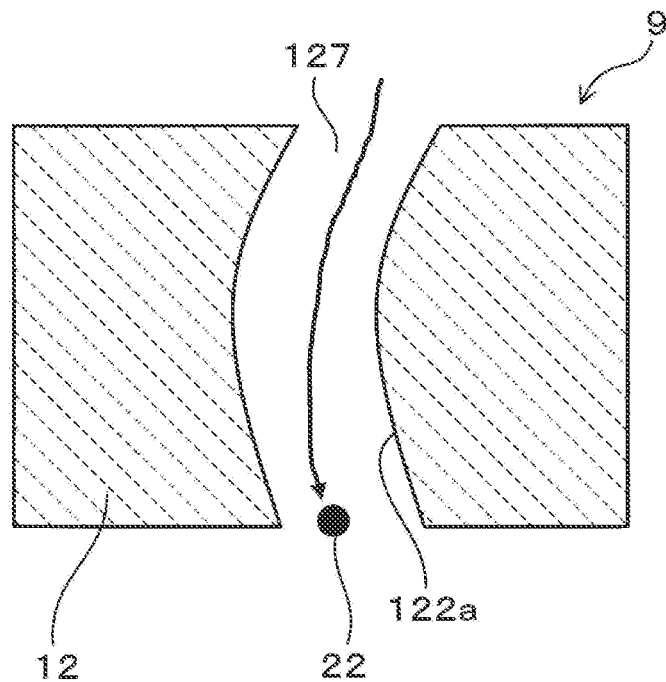
FIG. 18 is an enlarged schematic cross-sectional view of the partition wall in the comparative embodiment 1, which illustrates behavior of coarse PM in a large-diameter pore.

The coarse PM 22 is less likely to undergo Brownian motion, and thus the coarse PM 22 is collected in pores predominantly due to inertial collision in the pores. However, the coarse PM 22 is less likely to undergo inertial collision with the walls of large pores with diameters of more than 50 µm, as illustrated in FIG. 18 that will be referred to in relation to the comparative embodiment described later. Therefore, the coarse PM 22 with large diameter is likely to pass through the large pores and is less likely to be collected in the large pores.

Figure 5:
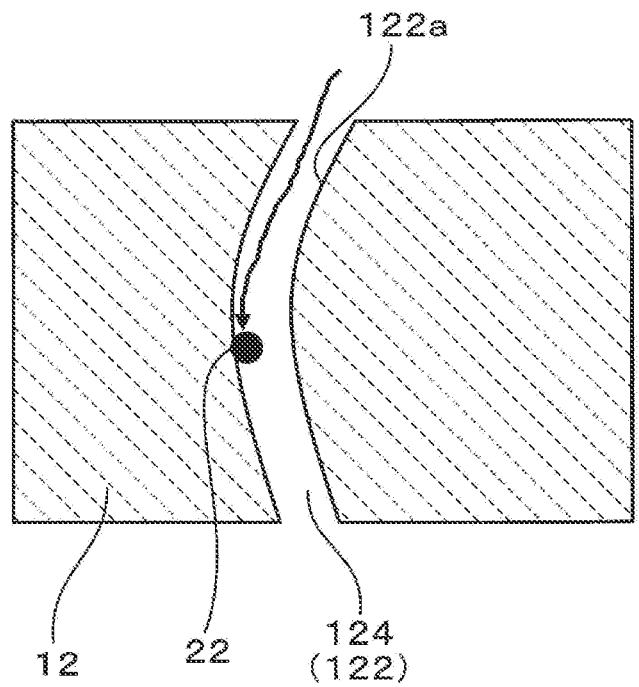
FIG. 5 is an enlarged schematic cross-sectional view of the partition wall in the first embodiment, which illustrates behavior of coarse PM in a simplified fine pore.
Figure 6:
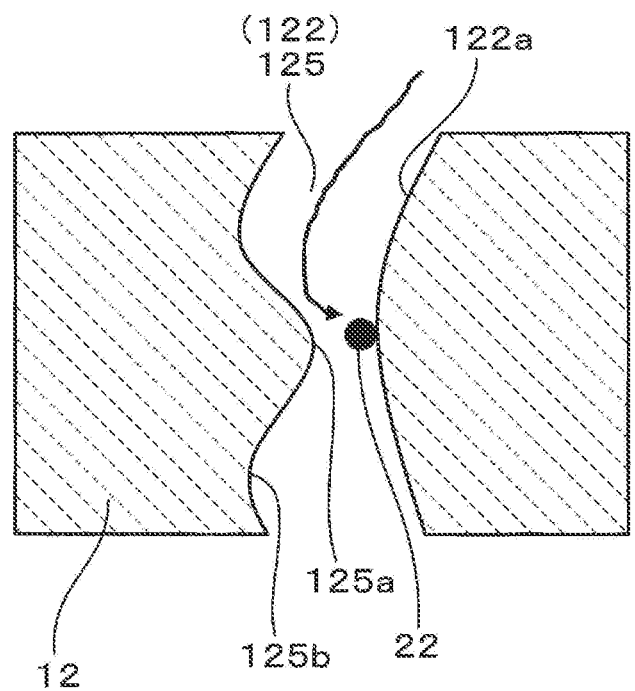
FIG. 6 is an enlarged schematic cross-sectional view of a partition wall in the first embodiment, which illustrates an example of behavior of coarse PM in a simplified constricted communication pore.

In contrast to this, as illustrated in FIG. 5, the coarse PM 22 is likely to collide with the walls of the fine pores 124 with diameters of 10 µm or less, due to the flow of the exhaust gas. That is, the coarse PM 22 highly probably undergoes inertial collision. Therefore, the coarse PM 22 with large diameters is likely to be collected in the fine pores 124. In the partition wall 12 that includes the fine pores 124 with diameters of 10 µm or less measured by the mercury intrusion method accounting for 5% or more of all the pores by volume, a large number of pores are likely to cause inertial collision with the coarse PM 22. This enhances the efficiency of collecting the coarse PM 22, thereby increasing the rate of collecting the PM 2.

Figure 7:
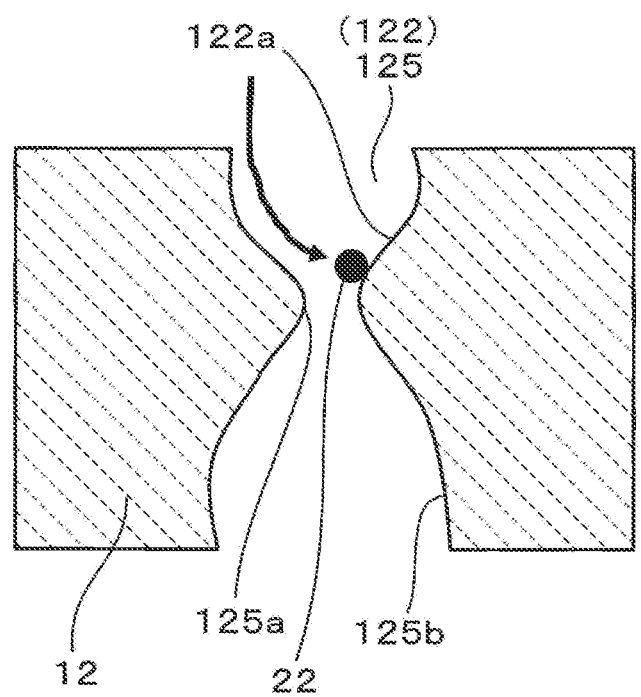
FIG. 7 is an enlarged schematic cross-sectional view of the partition wall in the first embodiment, which illustrates another example of behavior of coarse PM in a simplified constricted communication pore.
Figure 8:
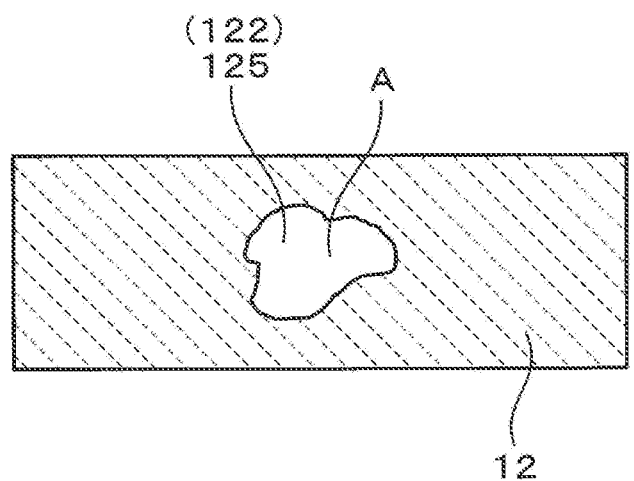
FIG. 8 is a cross-sectional view taken along arrow line VIII-VIII of FIG. 4.

The PM 2 such as the coarse PM 22 is likely to be collected in the partition wall 12 having the constricted communication pores 125. This is for the reason described below. As illustrated in FIGS. 4, 7, and 8, the constricted communication pores 125 have, for example, a large-diameter portion 125b of 50 µm or more and a constricted portion 125a that is significantly smaller in diameter in the communication pore 122. The presence of the constricted portion 125a makes the coarse PM 22 likely to collide with the wall of the constricted communication pore 125. That is, the coarse PM 22 highly probably comes into inertial collision. As a result, the efficiency of collecting the coarse PM 22 becomes higher in the constricted communication pore 125 where the coarse PM 22 is likely to be collected. In addition, the flow of the exhaust gas is narrowed in the constricted portion 125a satisfying $100 \times \Phi_2/\Phi_1 \leq 20$. Thus, the exhaust gas is unlikely to intensively flow into the constricted communication pores 125 and is distributed in the pores 121 that are present around the constricted communication pore 125. As a result, the exhaust gas is likely to flow into other pores, for example, the fine pores 124 that do not have the constricted portion 125a but are originally high in efficiency of collecting the PM 2 such as the coarse PM 22. That is, in the partition wall 12, the fine pores 124 likely to collect the PM 2 such as the coarse PM 22 increase in number, and the large pores, which are generally considered being unlikely to collect the coarse PM 22, are improved to easily collect the coarse PM 22 and suppress the flow of the exhaust gas into the large pores. This allows all the pores to collect the PM 2 such as the coarse PM 22. Therefore, it is possible to sufficiently increase the rate of collecting the PM 2 while suppressing a rise in pressure loss.

The constricted communication pore 125 can be examined by analyzing an X-ray CT image of the partition wall 12. As illustrated in FIGS. 4 and 8, the largest diameter $\Phi_1$ and the smallest diameter $\Phi_2$ of the communication pore 122 such as the constricted communication pore 125 take the largest value and smallest value of the diameter seen in a direction orthogonal to the thickness direction of the partition wall 12. The diameter of the communication pore 122 refers to an equivalent circle diameter, which is the diameter of a circle of the same area as an area A of the communication pore 122 in the section taken along the direction orthogonal to the thickness direction of the partition wall 12.

Figure 9:
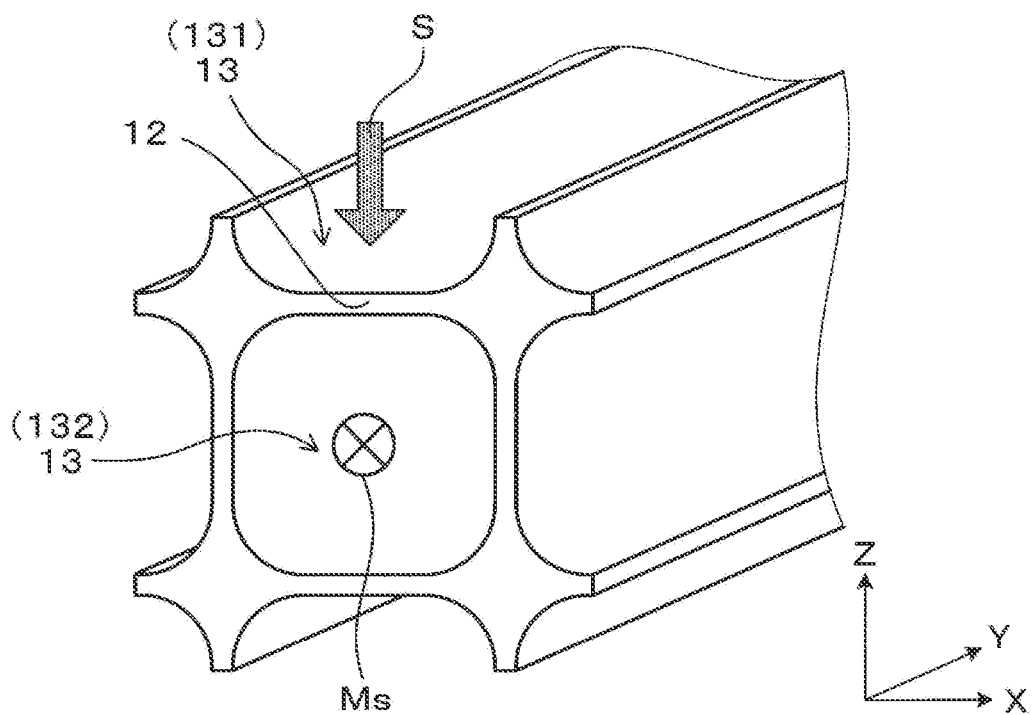
FIG. 9 is an explanatory diagram related to CT scanning of the partition wall in the first embodiment.

The largest diameter $\Phi_1$ and the smallest diameter $\Phi_2$ are measured as described below. First, an X-ray CT image of the partition wall 12 is captured by X-ray CT scanning. As illustrated in FIG. 9, a scanning direction S of CT scanning is, for example, a direction along the thickness direction of the partition wall 12 from a surface of the partition wall 12 on the first cell 131 side opened at the inflow-side end face 14 that is the upstream-side end face (hereinafter, called partition wall front surface 12a as appropriate) toward a surface of the partition wall 12 on the second cell 132 side opened at the outflow-side end face 15 that is the downstream-side end face (hereinafter, called partition wall back surface 12b as appropriate). Referring to FIG. 9, a direction along the axial direction Y is designated as Y direction, a direction perpendicular to the Y direction and along one of four sides of the partition wall 12 surrounding one second cell 132 is designated as X direction, and a direction perpendicular to the X direction and the Y direction is designated as Z direction. A sign Ms in FIG. 9 depicts one sealing part 16 on the inflow-side end face 14. The scanning direction S may be a direction from the partition wall back surface 12b toward the partition wall front surface 12a. As an X-ray CT device, a Versa XRM-500 produced by Xradia, Inc. is used. The measurement conditions are a voltage of 80 kV, a step of 0.1, and a resolution of 0.6874787 µm.

Figure 10A:
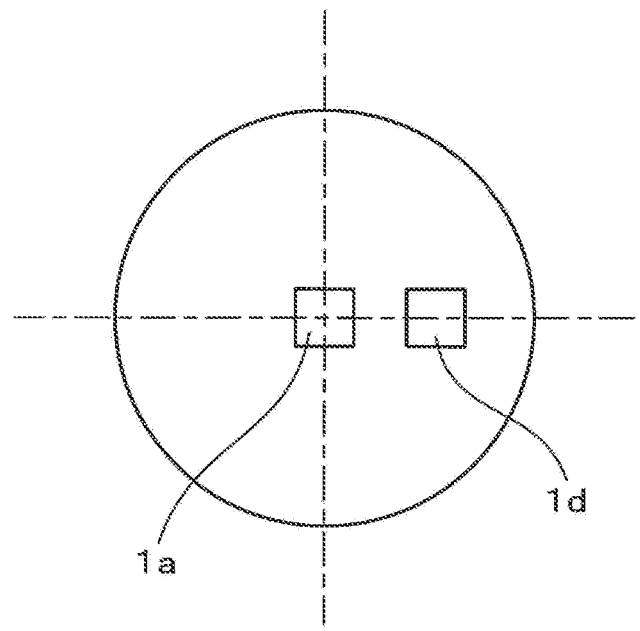
FIG. 10A is a diagram illustrating radial positions in the exhaust gas purification filter from which to take measurement samples in the first embodiment.
Figure 10B:
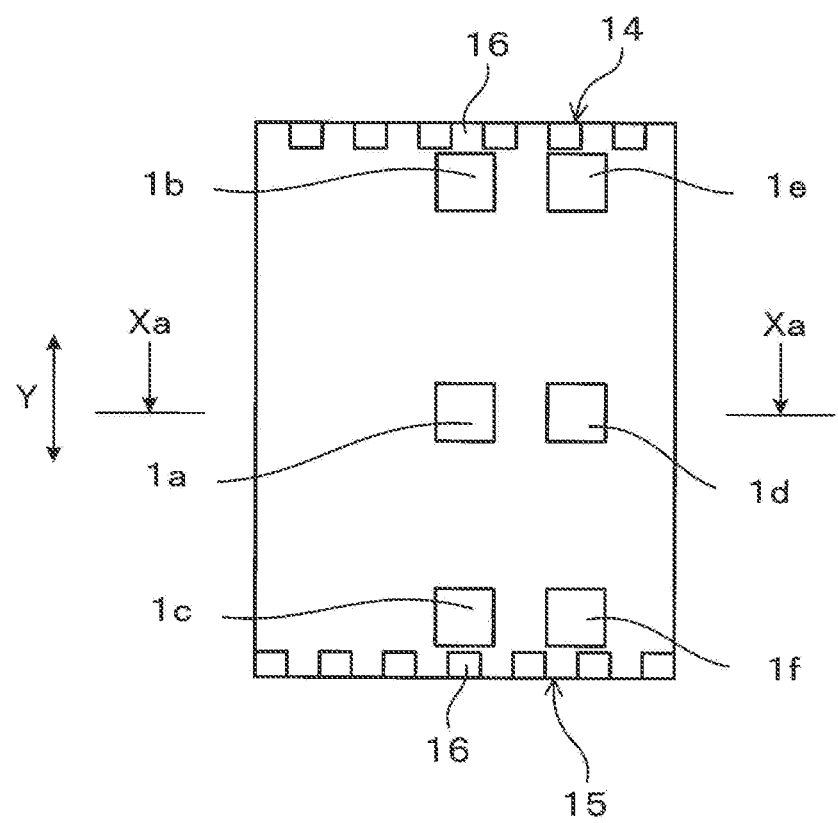
FIG. 10B is a diagram illustrating axial and radial positions in the exhaust gas purification filter from which to take measurement samples in the first embodiment.

CT scanning is specifically performed as described below. First, measurement samples are taken from the partition wall 12 of the exhaust gas purification filter 1. Specifically, as illustrated in FIGS. 10A and 10B, the measurement samples are taken from six portions: a central portion 1a, an inner portion 1b close to the sealing part 16 on the inflow-side end face 14 and an inner portion 1c close to the sealing part 16 on the outflow-side end face 15 in the axial direction Y that passes through the center in the diameter of the exhaust gas purification filter 1; and a central portion 1d, an inner portion 1e close to the sealing part 16 on the inflow-side end face 14, and an inner portion 1f close to the sealing part 16 on the outflow-side end face 15 in the axial direction Y that passes through the center in the radius of the exhaust gas purification filter 1. The measurement samples are 500 µm long along the axial direction Y, thick along the wall thickness direction, and 500 µm long along a direction orthogonal to the axial direction Y and the wall thickness direction.

Figure 11:
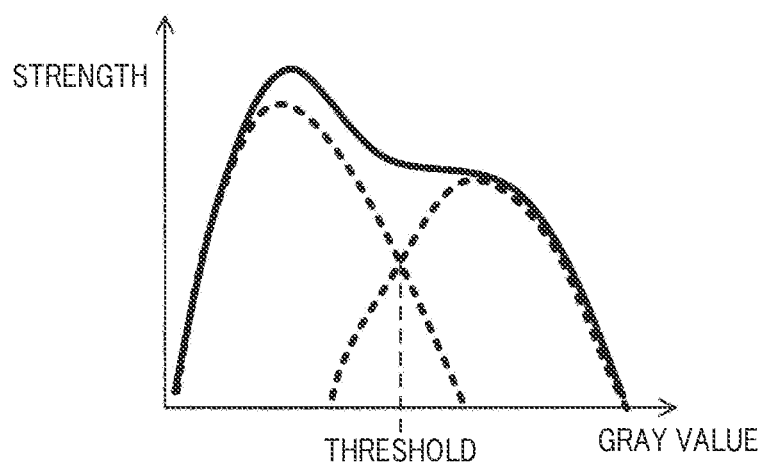
FIG. 11 is a diagram indicating a threshold for a binarization process in 3D modeling in the first embodiment.

Next, a 3D model of pores in the partition wall 12 is created by the analysis software Geo Dict produced by Math2Market GmbH, based on the X-ray CT image of each measurement sample. The 3D model is an image produced by the analysis software. Specifically, TIF-format continuous tomographic images obtained by X-ray CT scanning are taken in the minimum units of 0.6874787 μm/voxel by the importGeo-Vol function of the analysis software. Then, the 3D model is created with the crossing point between two separated peaks in a gray value graph as a threshold as illustrated in FIG. 11 in order to separate the pore portions and the solid portions in the captured images. That is, the 3D model is created by binarization. The solid portions are ceramic portions, that is, skeletal portions, and the pore portions are portions where ceramic is not present. Unnecessary portions are cut out from the 3D model along the sample shape in order to remove noise of the portions other than the partition wall 12 (that is, the portions where no ceramic or pores are present).

Next, the largest diameter $\Phi_1$ (μm) and the smallest diameter $\Phi_2$ (μm) of each communication pore 122 in the 3D model are measured by the analysis software Geo Dict. Specifically, the number of the communication pores and the smallest diameter of each communication pore 122 are determined by the Perucolation Path function of Prodict in the analysis software. Then, the partition wall 12 in the 3D model is sliced in a cross section perpendicular to the thickness direction, and the equivalent circle diameter of each communication pore 122 in the sliced section is determined. Then, the largest value and smallest value of the equivalent circle diameter of each communication pore 122 are determined. The largest value of each communication pores 122 is the largest diameter $\Phi_1$ of each communication pore 122, and the smallest value of each communication pore 122 is the smallest diameter $\Phi_2$ of each communication pore 122. The largest diameter $\Phi_1$ (μm) and the smallest diameter $\Phi_2$ (μm) of each communication pore 122 are determined through slicing in the units of voxels in the thickness direction of the partition wall 12. The communication pore 122 satisfying $\Phi_1 \geq 50$, $100 \times \Phi_2/\Phi_1 \leq 20$ is the constricted communication pore 125. The largest diameter $\Phi_1$ and the smallest diameter $\Phi_2$ are arithmetic mean values of diameters of the measurement samples taken from the six portions described above. This is also applied to the proportion of the constricted communication pores.

The proportion of the constricted communication pores 125 in all the communication pores 122 is preferably 20% or more. In this case, the effect of increasing the collection efficiency is more significant. The proportion of the constricted communication pores 125 in all the communication pores 122 will be called "proportion of constricted communication pores" as appropriate. The proportion of the constricted communication pores 125 is preferably 80% or less. The proportion of the constricted communication pores 125 is measured as described below. First, the number of all the communication pores and the equivalent circle diameter of each communication pore 122 are determined using the analysis software Geo Dict. Then, 100×the number of the constricted communication pores/the number of all the communication pores is calculated, from the number of the constricted communication pores 125 of which the largest diameter $\Phi_1$ and the smallest diameter $\Phi_2$ of each communication pore 122 satisfy $\Phi_1 \geq 50$, $100 \times \Phi_2/\Phi_1 \leq 20$ and the number of all the communication pores. The calculation result is the proportion of the constricted communication pores 125. The number of all the communication pores and the equivalent circle diameters of all the communication pores 122 are determined by the method described above.

The exhaust gas purification filter 1 in the present embodiment is applicable to purification of an exhaust gas discharged from a normal gasoline engine but is preferable for purification an exhaust gas discharged from a gasoline engine in a hybrid vehicle that is frequently stopped and restarted. An engine frequently stopped and restarted, like an engine mounted in a hybrid vehicle, discharges coarse PM 22 containing a large amount of SOFs. The exhaust gas purification filter 1 of the present embodiment has a large number of pores 124 and also has the constricted communication pores 125 in the partition wall 12. This increases the probability of inertial collision with the coarse PM 22 while suppressing a pressure loss, thereby leading to a rise in the rate of collecting the PM 2.

Fine PM with small particle diameters is collected predominantly through collision with pore walls due to Brownian motion. Therefore, fine PM 21 is sufficiently collected by the constricted communication pores 125 in the exhaust gas purification filter 1 of the present embodiment. Furthermore, the fine PM 21 is also sufficiently collected even by the communication pores 122 other than the constricted communication pores 125, such as the fine pores 124, and the pores 121.

The exhaust gas purification filter 1 preferably has a collection efficiency of 65% or more and a pressure loss of 7 kPa or less. The exhaust gas purification filter 1 more preferably has a collection efficiency of 70% or more and more preferably has a pressure loss of 6 kPa or less.

The exhaust gas purification filter 1 is manufactured, for example, as described below. First, a body paste containing a cordierite-forming material is prepared. The body paste is prepared by adjusting talc, silica, aluminum hydroxide, and the like for a cordierite composition, and mixing with a binder, a lubricant, and water. The body paste may be blended with alumina and kaolin for a cordierite composition.

Then, the body paste is molded, dried, and fired. This forms the honeycomb structure part 10. The sealing parts 16 are formed before or after the firing of the honeycomb structure part 10. That is, the sealing parts 16 are formed by alternately sealing the end faces of the cells in the molded honeycomb structure 10 before or after the firing with a slurry for forming seal parts, and then firing the slurry.

The pore diameter distribution of the honeycomb structure part 10 can be controlled by adjusting the particle diameter and mixture proportion of an pore formation material 129 in a cordierite formation material 128 (see FIGS. 12A, 12B, 13A, and 13B). Accordingly, it is possible to increase the proportion of the fine pores 124 by volume to 5% or more, for example, to form the constricted communication pores 125, and increase the proportion of the constricted communication pores 125 to 20% or more, for example. The pore formation material is a material that forms pores when being melted at the time of firing, and is a Si source such as silica or talc. In particular, the proportion of the fine pores 124 by volume and the proportion of the constricted communication pores 125 can be regulated by adjusting the proportion of silica.

Figure 12A:
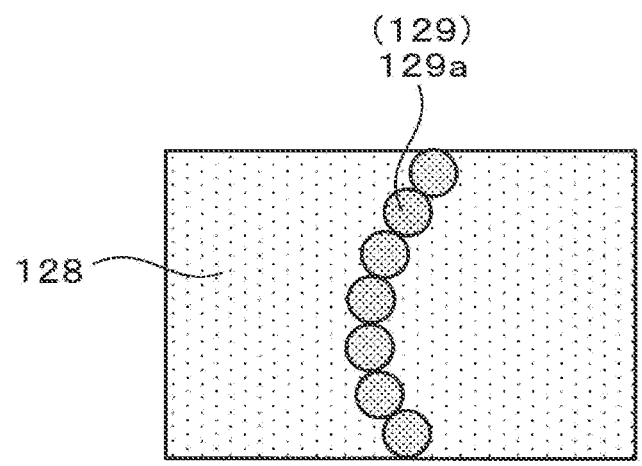
FIG. 12A is a diagram illustrating an example of arrangement of a pore formation material in the case of forming a fine pore in the first embodiment.
Figure 12B:
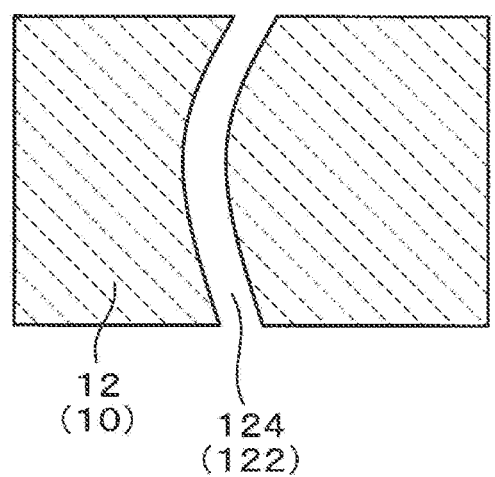
FIG. 12B is an enlarged schematic cross-sectional view of the partition wall in which the fine pore is formed in the first embodiment.
Figure 13A:
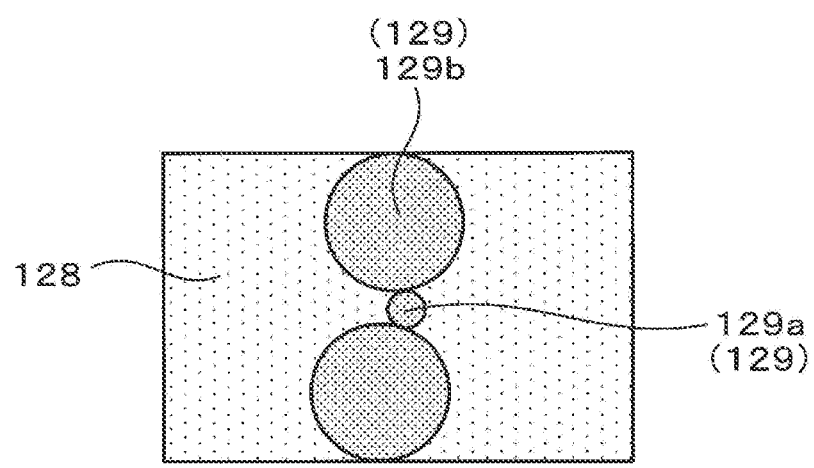
FIG. 13A is a diagram illustrating an example of arrangement of pore formation materials in the case of forming a constricted communication pore in the first embodiment.
Figure 13B:
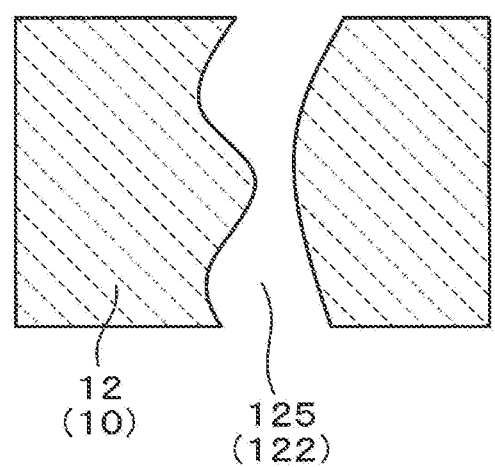
FIG. 13B is an enlarged schematic cross-sectional view of the partition wall in which a constricted communication pore is formed in the first embodiment.

As illustrated in FIGS. 12A, 12B, 13A, and 13B, the communication pores 122 are formed from a large number of pieces of pore formation material 129 adjacent to each other in the cordierite formation material 128. The proportion of the fine pores 124 by volume and the proportion of the constricted communication pores 125 are regulated by changing the particle diameter and mixture proportion of the pore formation material. Specifically, besides an original pore formation material 129b with a particle diameter distribution corresponding to the pore distribution in the exhaust gas purification filter 1, an pore formation material 129a with particle diameters corresponding to the smallest diameters of the pores with pore diameters of μm or less and the communication pores 122 (specifically, the constricted communication pores 125) are added. As illustrated in FIGS. 12A and 12B, when the added pore formation materials (for example, talc and talc, silica and silica, or talc and silica) are adjacent to each other, pores with diameters of 10 μm or less are formed. As illustrated in FIGS. 13A and 13B, when the particles of the added pore formation material 129a are adjacent to the particles of the original pore formation material 129b with larger particle diameters, the smallest-diameter communication pores 122 are formed as the constricted communication pores 125. As described above, the proportion of the fine pores 124 by volume and the proportion of the constricted communication pores 125 can be regulated by adjusting the particle diameters and amounts of the added pore formation materials.

Figure 14:
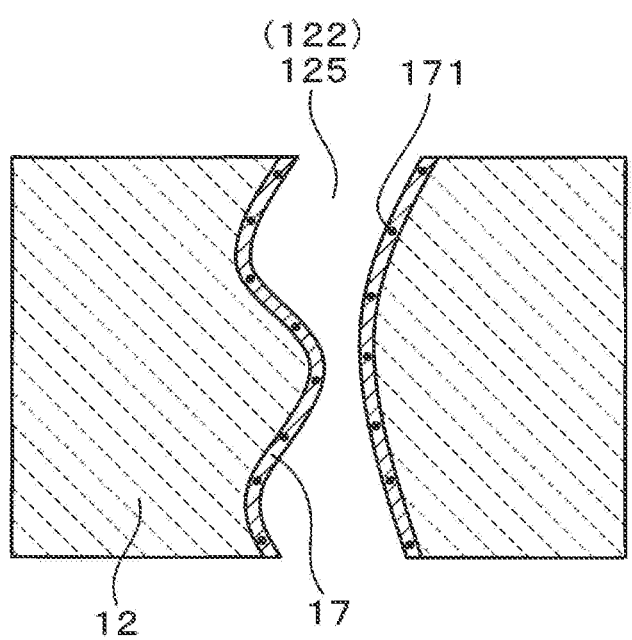
FIG. 14 is an enlarged schematic cross-sectional view of the partition wall supporting a catalyst in the first embodiment.

The exhaust gas purification filter 1 can support a catalyst 171 made of a noble metal such as Pt, Rh, or Pd. The catalyst 171 is supported together with alumina, a promoter, and the like. Examples of the promotor include ceria, zirconia, ceria-zirconia solid solution, and the like. Specifically, as illustrated in FIG. 14, a coat layer 17 containing the catalyst 171, alumina, a promotor, and the like can be formed on the partition wall 12.

The coat layer 17 containing the catalyst is at least supported on pore walls 122a and may be supported also on the surfaces of the partition wall 12 (the surface of the partition wall 12 facing the cells). As a method for supporting the 2 on the pore walls 122a, for example, there is the in-wall coat method by which a catalyst-containing slurry is introduced by suction into the communication pores 122 in the partition wall 12.

The exhaust gas purification filter 1 can support, for example, a 0.1 to 5.0 g/L noble metal catalyst and a 50 to 120 g/L coat layer. The catalyst-supported partition wall 12 preferably includes the fine pores 124 with pore diameters of 10 μm or less by a volume of 5% or more and has the constricted communication pores 125. With the catalyst supported, the proportion of the constricted communication pores 125 is preferably 20% or more.

In many cases, the exhaust gas purification filter 1 is used in a state where the coat layer containing the catalyst is supported. The exhaust gas purification filter 1 preferably keeps the constricted communication pores 125 in the partition wall 12 even with the coat layer supported. The amount of the supported coat layer 50 g/L or more is preferable in satisfying the future exhaust gas regulations. According to the above-described configuration, it is possible to improve the collection efficiency and suppress the pressure loss even with the coat layer supported. In the state where the coat layer containing the catalyst is supported, the largest diameter $\Phi_1$ (μm) and the smallest diameter $\Phi_2$ (μm) of the communication pores 122 and the proportion of the constricted communication pores 125 are determined in accordance with the method based on the 3D model described above, and the proportion of the fine pores 124 by volume is measured by the mercury intrusion method.

As described above, according to the present embodiment, it is possible to provide the exhaust gas purification filter 1 that has a low pressure loss and a high collection efficiency.

Second Embodiment

Next, an embodiment of an exhaust gas purification system including an exhaust gas purification filter will be described. Among the reference signs used for the second and subsequent embodiments, the same reference signs as those used in the preceding embodiments represent components similar to the components in the preceding embodiments.

Figure 15:
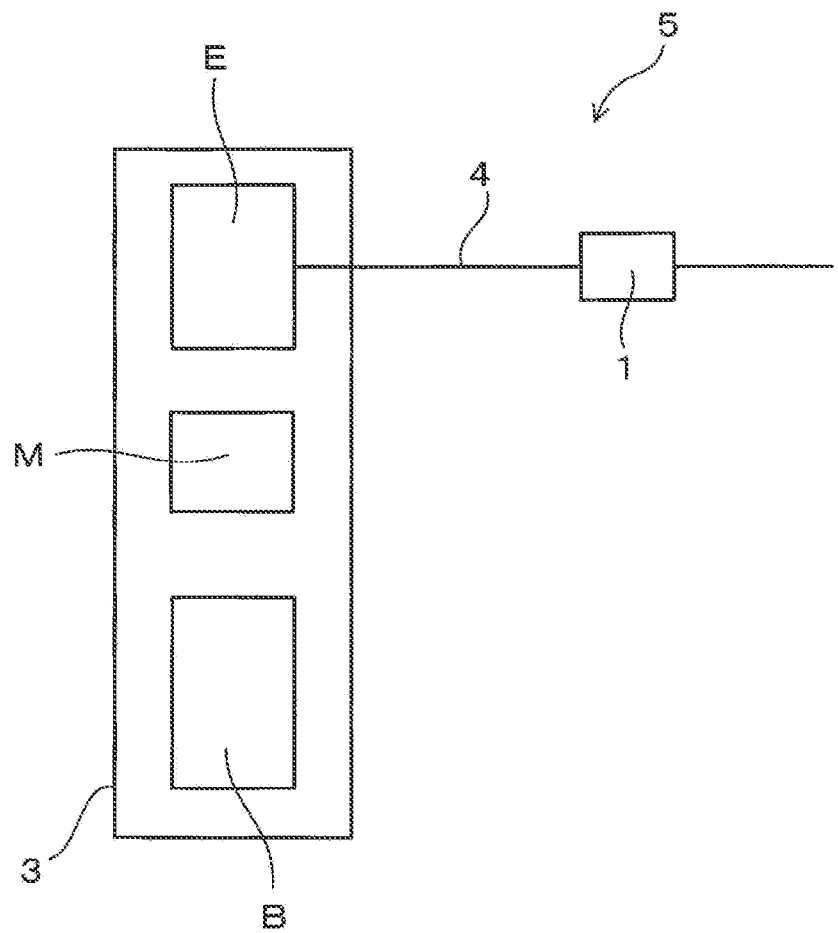
FIG. 15 is a schematic view of an exhaust gas purification system in a second embodiment.

As illustrated in FIG. 15, an exhaust gas purification system 5 includes a hybrid driving apparatus 3, an exhaust pipe 4, and an exhaust gas purification filter 1. The hybrid driving apparatus 3 includes at least an engine E. The engine E is a gasoline engine, for example. The hybrid driving apparatus 3 may further include a motor M and a battery B.

The motor M assists driving by the engine E at the time of acceleration or start of the vehicle, and performs regenerative power generation during inertial running or braking. The battery B is chargeable and dischargeable, discharges electricity at the time of acceleration or starting to supply electric power to the motor M and drive the motor M, and can be charged by electric power obtained through regenerative power generation at the motor M during inertial running or braking.

Figure 16:
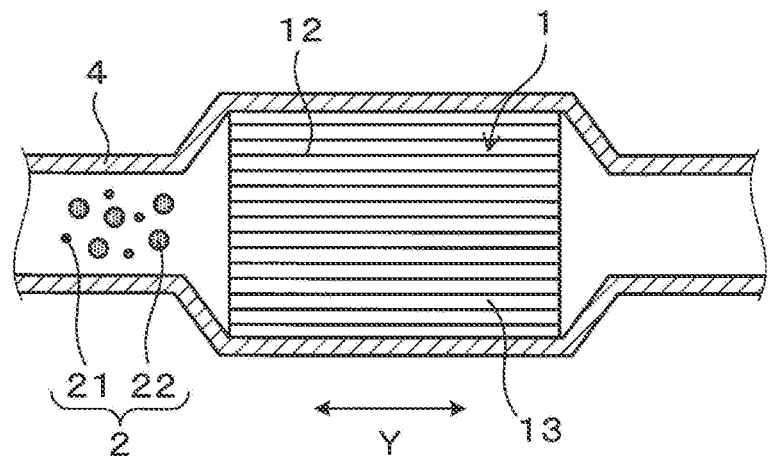
FIG. 16 is a schematic cross-sectional view of an exhaust gas purification filter arranged in an exhaust pipe in the second embodiment.

The exhaust pipe 4 is connected to the engine E. As illustrated in FIG. 16, the exhaust gas containing the PM 2 flows in the exhaust pipe 4. In order to clean up the exhaust gas, the exhaust gas purification filter 1 of the first embodiment is arranged in the exhaust pipe 4.

The PM 2 includes fine PM 21 with small particle diameters and coarse PM 22 with large particle diameters. Since the engine E is frequently stopped and restarted in the hybrid driving apparatus 3, the exhaust gas containing a large amount of SOFs is likely to flow into the exhaust pipe 4 and the coarse PM 22 is discharged with high frequency.

In the present embodiment, the exhaust gas purification filter 1 arranged in the exhaust pipe 4 is configured similarly to the exhaust gas purification filter 1 in the first embodiment that is excellent in the capability of collecting the coarse PM 22. Therefore, the coarse PM 22 discharged from the engine E of the hybrid driving apparatus 3 can be sufficiently collected. Furthermore, it is possible to keep the pressure loss at a low level, thereby further improving fuel efficiency.

Comparative Embodiment 1

Figure 17:
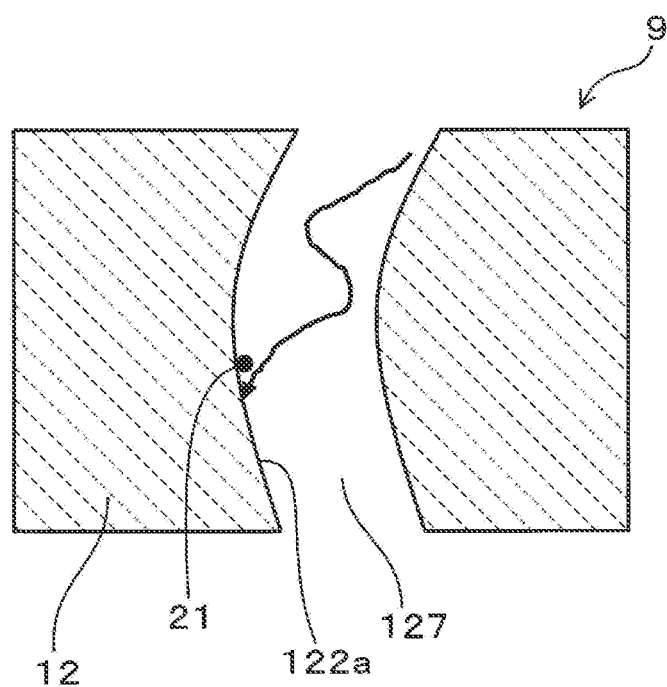
FIG. 17 is an enlarged schematic cross-sectional view of a partition wall in a comparative embodiment 1, which illustrates behavior of fine PM in a large-diameter pore.

As the comparative embodiment 1, an exhaust gas purification filter 9 of which the pore diameter distribution is adjusted to large-diameter pores will be described. As illustrated in FIG. 17, the fine PM 21 reduced in diameter due to the improvement of diesel engines is likely to undergo Brownian motion in large pores 127. Therefore, the fine PM 21 is highly likely to collide with pore walls 122a and is likely to be collected in the partition wall 12.

On the other hand, the coarse PM 22 containing SOFs and the like is unlikely to undergo Brownian motion. Therefore, as illustrated in FIG. 18, the coarse PM 22 is less likely to collide with the pore walls 122a in the large pores 127, and is unlikely to be collected in the pore walls 122a of the large pores 127.

Figure 19:
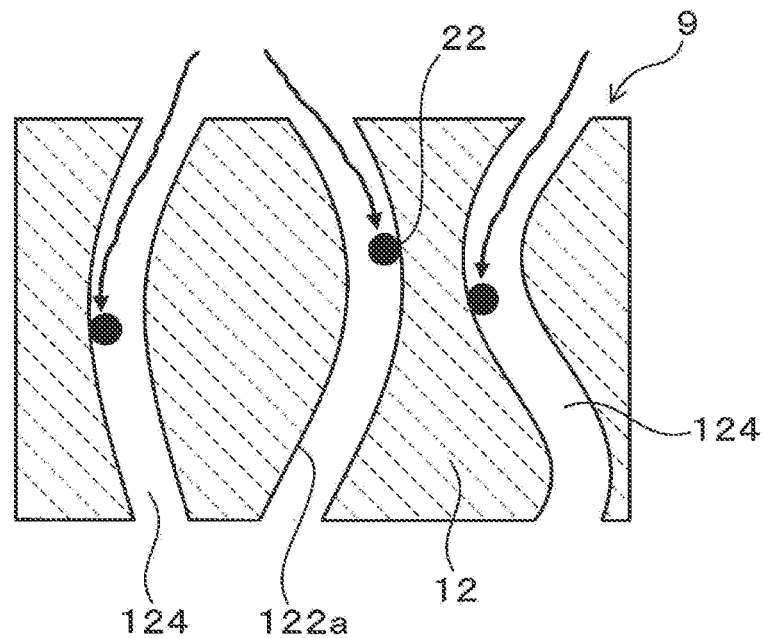
FIG. 19 is an enlarged schematic cross-sectional view of the partition wall in the comparative embodiment 1, which illustrates behavior of coarse PM in fine pores.

As illustrated in FIG. 19, simply increasing the fine pores 124 in the partition wall 12 would raise the probability of collision between the coarse PM 22 and the pore walls 122a and raise the collection efficiency, but would cause a larger pressure loss.

Experimental Example 1

In the experimental example 1, the relationships among the proportion of the fine pores 124 with pore diameters of 10 μm or less by volume, the proportion of the constricted communication pores 125, the collection efficiency, and the pressure loss were determined, First, a plurality of exhaust gas purification filters 1 different in the proportion of the fine pores 124 by volume and the proportion of the constricted communication pores 125 was prepared.

Each of the exhaust gas purification filters 1 was produced as described above. First, talc, silica, and aluminum hydroxide were prepared so as to form a cordierite composition after firing, and were mixed with a binder, a lubricant, and water to produce a body paste. The body paste was subjected to extrusion molding to obtain a molded body. Then, the molded body was dried to obtain a dried honeycomb structure. The cells in the end faces of the dried structure were alternately sealed such that the end faces had a check pattern. Then, the honeycomb structure was fired to obtain the exhaust gas purification filter 1.

Each of the exhaust gas purification filters 1 was in the shape of a circular column with a diameter of 118 mm and an axial length of 120 mm. The cell wall thickness was 8.5 mil, the cell density was 300 cpsi, and the cell shape in the cross section orthogonal to the axial direction was square.

In the present example, the plurality of exhaust gas purification filters 1 was produced such that they had a 20% or more proportion of the constricted communication pores 125 by volume and had different proportions of the fine pores 124 with pore diameters 10 μm or less by volume, by adjusting the particle diameter ratio between silica and talc that were raw materials for cordierite. In addition, the plurality of exhaust gas purification filters 1 was produced such that they had a 5% proportion of the fine pores 124 by volume and had different proportions of the constricted communication pores 125.

Each of the exhaust gas purification filters 1 was adjusted such that the average pore diameter was 15 to 22 μm and the porosity was 60 to 70%. The porosity and the average pore diameter were measured as described below.

Porosity and Average Pore Diameter

The porosity and average pore diameter in the partition wall 12 of the exhaust gas purification filter 1 were measured by a mercury porosimeter using the principles of the mercury intrusion method. The average pore diameter is also called average air pore diameter. The mercury porosimeter used was an AutoPore IV9500 produced by Shimadzu Corporation. The measurement conditions were as described below.

First, test pieces for measurement were cut out from test samples. The test pieces had a shape of rectangular parallelepiped with dimensions of 15 mm×15 mm seen in the direction orthogonal to the axial direction Y and a length of 20 mm seen in the axial direction Y. The test pieces were taken from six portions similar to the six portions in the measurement sample for CT scanning described above, and the arithmetic average of measurement values was taken as the measurement result. Then, the test pieces were stored in a measurement cell of the mercury porosimeter and the measurement cell was brought under reduced pressure. Thereafter, mercury was introduced into the measurement cell, and the measurement cell was pressurized. The pore diameter and pore volume were measured from the pressure during the pressurization and the volume of the mercury introduced into the pores in the test pieces.

The measurement was made within a pressure range of 0.5 to 20000 psia, where 0.5 psia corresponds to $0.35 \times 10^{-3}$ kg/mm$^2$ and 20000 psia corresponds to 14 kg/mm$^2$. The range of pore diameters corresponding to the pressure range is 0.01 to 420 μm. As constants for calculating the pore diameter from the pressure, a contact angle of 140° and a surface tension of 480 dyn/cm were used. The average pore diameter refers to the pore diameter with an integrated value 50% of the pore volume. The porosity was calculated by the following relational expression, where the true specific gravity of cordierite was 2.52:

Porosity(%)=total pore volume/(total pore volume+1/true specific gravity of cordierite)×100.

The proportion of the fine pores 124 by volume in each of the exhaust gas purification filters 1, that is, the proportion of the pores with diameters of 10 μm or less by volume was measured as described below.
(Proportion of Fine Pores by Volume)

The pore diameter distribution was measured in each of the exhaust gas purification filters 1 by the mercury intrusion method. The mercury intrusion method was performed under the same conditions as those for measurement of the porosity and average pore diameter described above. Then, based on the pore diameter distribution, the proportion of pores with diameters of 10 μm or less, that is, the proportion of the fine pores 124 by volume was determined.

The proportion of the constricted communication pores 125 in each of the exhaust gas purification filters 1 was measured by the CT scanning method in the first embodiment. The rate of collecting the PM 2 and pressure loss in each of the exhaust gas purification filters 1 were measured as described below.
(PM Collection Efficiency)

Each of the exhaust gas purification filters 1 was attached in the exhaust pipe of a 2.0-L gasoline direct-injection engine and placed in a state with an intake air amount (Ga) of 20 g/s (steady state). Then, an exhaust gas containing the PM 2 was allowed to flow to the exhaust gas purification filter 1. The concentration of the PM in the exhaust gas before being flown into the exhaust gas purification filter 1 and the concentration of the PM in the exhaust gas flown out of the exhaust gas purification filter 1 were measured to calculate the rate of collecting the PM 2.
(Loss of Pressure)

Each of the exhaust gas purification filters 1 was attached in the exhaust pipe of a 2.0-L gasoline direct-injection engine and placed in a state with an intake air amount (Ga) of 100 g/s (steady state). Then, an exhaust gas containing the PM 2 was allowed to flow to the exhaust gas purification filter 1. The pressures in the exhaust gas purification filter 1 before and after the flowing of the exhaust gas were measured, and the difference between the pressures was determined as a pressure loss.

Tables 1 and 2 show the measurement results of the exhaust gas purification filters (specifically, the test samples 1 to 25). The graphs in FIGS. to 22 also depict the measurement results.

TABLE 1

| Test sample | Proportion of pores with diameters of 10 μm or less by volume (%) | Proportion of constricted communication pores (%) | Collection efficiency (%) | Pressure loss (kPa) |
|---|---|---|---|---|
| Test sample 1 | 3 | 23 | 59 | 5.5 |
| Test sample 2 | 4 | 21 | 62 | 5.5 |
| Test sample 3 | 5 | 20 | 65 | 5.6 |
| Test sample 4 | 9 | 21 | 67 | 5.8 |
| Test sample 5 | 15 | 26 | 69 | 6.0 |
| Test sample 6 | 21 | 24 | 70 | 6.5 |

TABLE 1-continued

| Test sample | Proportion of pores with diameters of 10 μm or less by volume (%) | Proportion of constricted communication pores (%) | Collection efficiency (%) | Pressure loss (kPa) |
| --- | --- | --- | --- | --- |
| Test sample 7 | 25 | 26 | 71 | 7.0 |
| Test sample 8 | 27 | 25 | 71 | 7.6 |
| Test sample 9 | 30 | 27 | 72 | 9.5 |
| Test sample 10 | 3 | 7 | 54 | 4.0 |
| Test sample 11 | 4 | 9 | 55 | 4.1 |
| Test sample 12 | 5 | 7 | 56 | 4.2 |
| Test sample 13 | 9 | 10 | 59 | 4.4 |
| Test sample 14 | 15 | 8 | 61 | 4.7 |
| Test sample 15 | 21 | 9 | 62 | 5.5 |
| Test sample 16 | 25 | 12 | 63 | 6.5 |
| Test sample 17 | 27 | 11 | 64 | 7.2 |
| Test sample 18 | 30 | 13 | 65 | 9.0 |

TABLE 2

| Test sample | Proportion of pores with diameters of 10 μm or less by volume (%) | Proportion of constricted communication pores (%) | Collection efficiency (%) |
| --- | --- | --- | --- |
| Test sample 19 | 5 | 3 | 56 |
| Test sample 20 | 5 | 9 | 59 |
| Test sample 21 | 5 | 15 | 63 |
| Test sample 3 | 5 | 20 | 65 |
| Test sample 22 | 5 | 29 | 66 |
| Test sample 23 | 5 | 39 | 67 |
| Test sample 24 | 5 | 48 | 67 |
| Test sample 25 | 5 | 61 | 68 |

Figure 20:
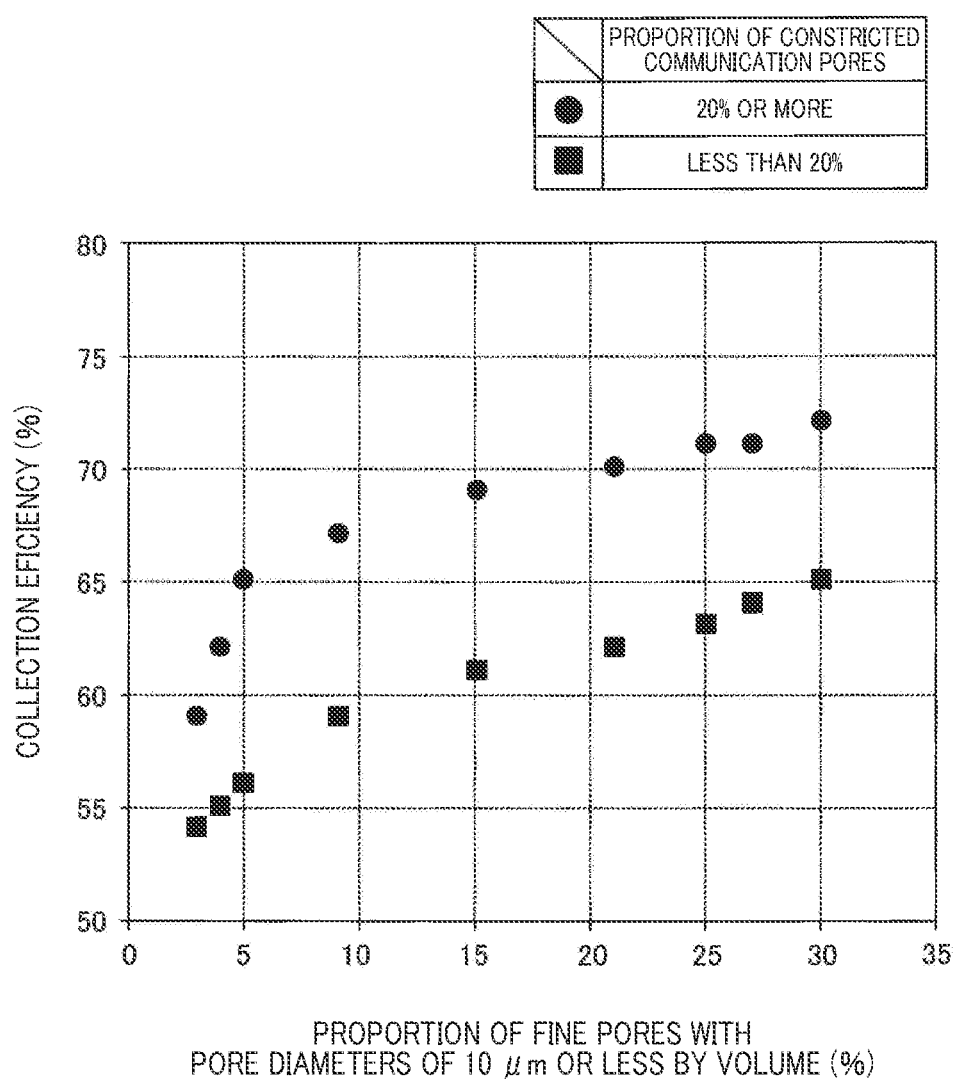
FIG. 20 is a diagram illustrating the relationship between the proportion of fine pores by volume and the collection efficiency in an experimental example 1.
Figure 21:
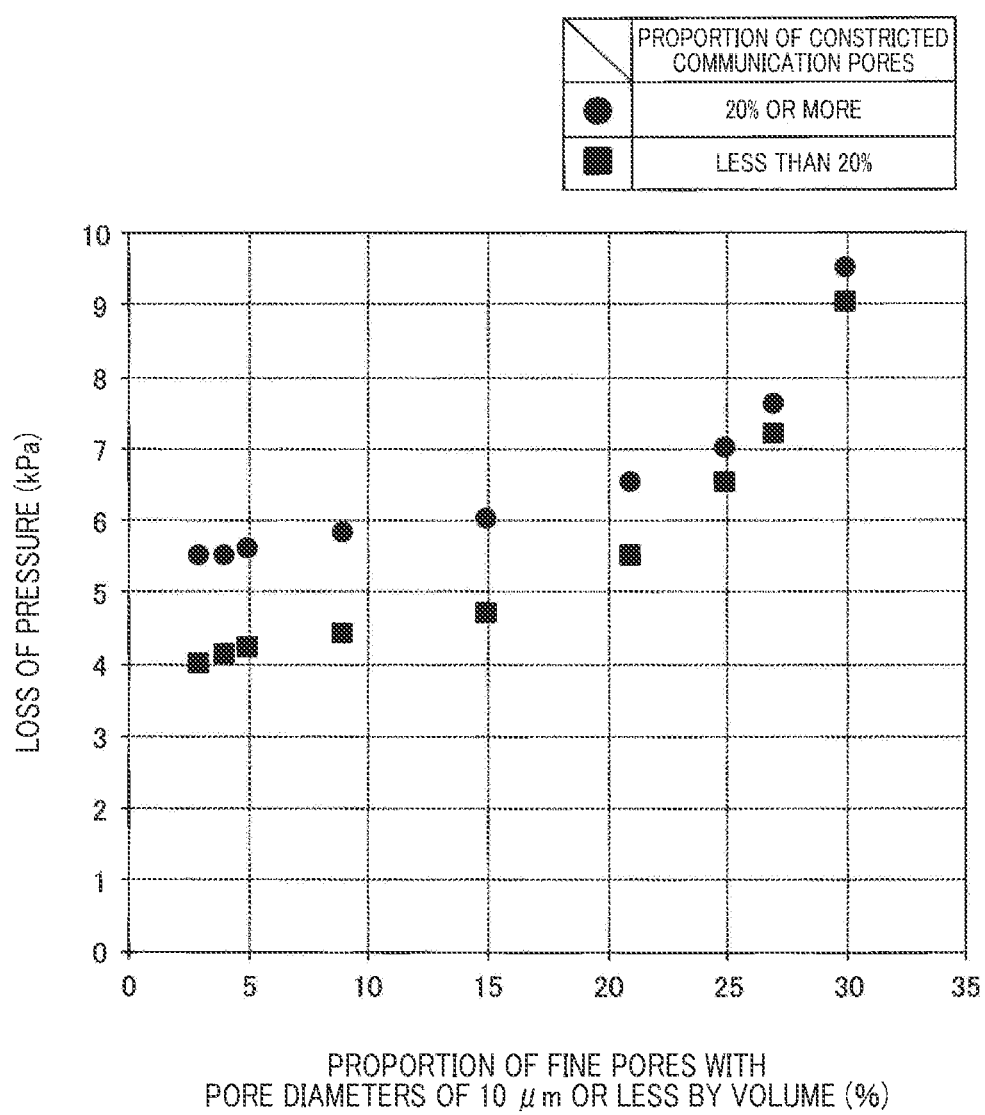
FIG. 21 is a diagram illustrating the relationship between the proportion of fine pores by volume and the pressure loss in the first embodiment.
Figure 22:
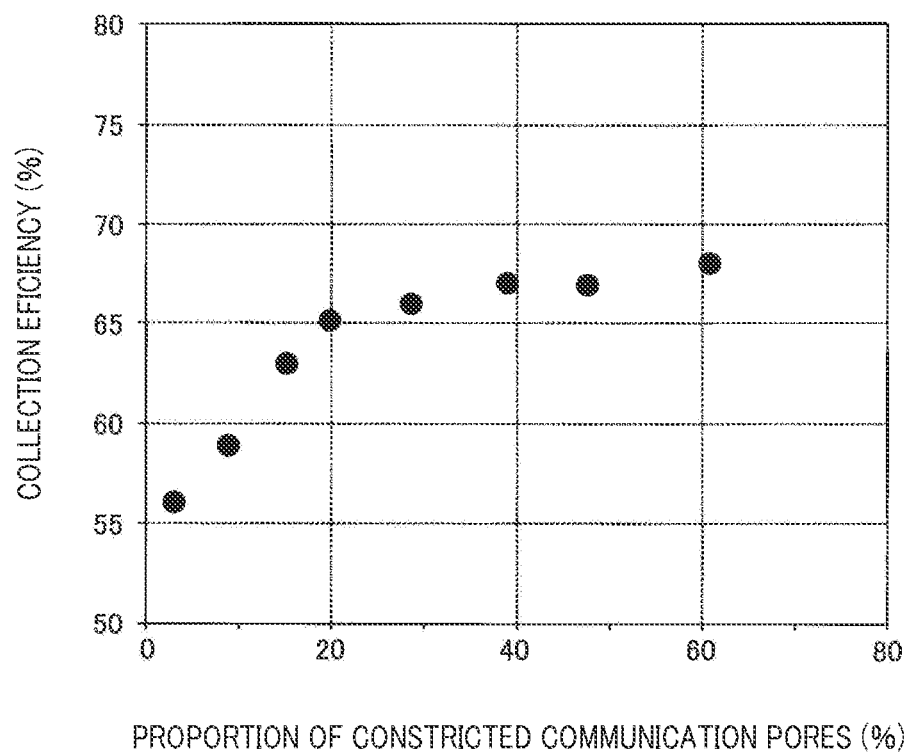
FIG. 22 is a diagram illustrating the relationship between the proportion of constricted communication pores and the collection efficiency in the first embodiment.

FIG. 20 shows the relationships between the proportion of the fine pores 124 by volume and the collection efficiency where the proportion of the constricted communication pores 125 is 20% or more or less than 20%. FIG. 21 shows the results of the proportion of the fine pores 124 by volume and the pressure loss where the proportion of the constricted communication pores 125 is 20% or more or less than 20%. FIG. 22 shows the relationship between the proportion of the constricted communication pores 125 and the collection efficiency where the volume of the fine pores 124 is 5%.

As illustrated in FIGS. 20 and 21, as the proportion of the fine pores 124 by volume is larger, the collection efficiency becomes higher. When the proportion of the fine pores 124 is 5% or more by volume, the collection efficiency becomes sufficiently high. In addition, as seen from FIGS. 20 and 22, forming the constricted communication pores 125 and increasing its proportion enhances the effect of improving the collection efficiency. When the proportion of the constricted communication pores 125 is 20% or more, the collection efficiency increases significantly. When the proportion of the constricted communication pore 125 is 20% or more, the collection efficiency sharply improves until the proportion of the fine pores 124 reaches 5% by volume. Then, when the proportion of the fine pores 124 becomes 5% by volume, the collection efficiency reaches 65%, and when the proportion of the fine pores 124 is 5% or more by volume, the collection efficiency improves moderately. On the other hand, when the proportion of the constricted communication pores 125 is less than 20%, the collection efficiency reaches 65% when the volume of the fine pores is 30%. As the proportion of the fine pores by volume is larger, the pressure loss tends to be higher. Therefore, from the viewpoint of lowering the pressure loss and improving the collection efficiency, the proportion of the constricted communication pores 125 is preferably 20% or more. Even if the proportion of the constricted communication pores is less than 20%, it is possible to produce the effect of increasing the collection efficiency while reducing the pressure loss.

When the proportion of the constricted communication pores is 20% or more, the pressure loss rises moderately until the proportion of the fine pores reaches 25% by volume, and then reaches 7 kPa. When the proportion of the fine pores by volume becomes even larger, the pressure loss increases sharply. In contrast to this, when the proportion of the constricted communication pores is less than 20%, the pressure loss becomes gradually larger. When the proportion of the fine pores is 27% by volume, the pressure loss exceeds 7 kPa and becomes 7.2 kPa. From the viewpoint of further reducing the pressure loss in the exhaust gas purification filter, the proportion of the fine pores 124 is preferably 25% or less by volume, more preferably 20% or less, and further preferably 15% or less.

From the viewpoint of further increasing the collection efficiency, the proportion of the constricted communication pores 125 is more preferably 40% or more, further preferably 60% or more. From the same viewpoint, the proportion of the fine pores 124 is more preferably 10% or more by volume, further preferably 21% or more.

The present disclosure is not limited to the above-described embodiments but can be applied to various embodiments without departing from the gist of the present disclosure. For example, in the second embodiment, the exhaust gas purification filter 1 of the first embodiment is applied to the exhaust gas purification system 5 having the hybrid driving apparatus 3. The present disclosure is also applicable to an exhaust gas purification system including a diesel engine or a gasoline engine instead of a hybrid driving device 3. The exhaust gas purification filter 1 is also usable for collecting PM discharged from an internal combustion engine other than a diesel engine and a gasoline engine.

The present disclosure has been described below in accordance with the embodiments, but it should be understood that the present disclosure is not limited to the embodiments, structures, and the like. The present disclosure also includes various modification examples and modifications within the scope of equivalency. In addition, various combinations and modes, and other combinations and modes including only one element of the foregoing combinations and modes, less or more than the one element are included in the scope and conceptual range of the present disclosure.

What is claimed is:

1. An exhaust gas purification filter comprising:
    a honeycomb structure part that has a porous partition wall and a plurality of cells defined by the partition wall to form an exhaust gas flow path; and
    a sealing part that seals alternately a gas inflow-side end face or a gas outflow-side end face of the cells, wherein
    the exhaust gas purification filter includes fine pores with diameters of 10 μm or less measured by the mercury intrusion method that account for a range of 5% or more and 25% or less of all pores by volume in the honeycomb structure part, and
    an average diameter of the pores in the partition wall is a range of 15 μm or more and 22 μm or less and a porosity of the partition wall is a range of 60% or more and 70% or less,
    the partition wall has a plurality of communication pores communicating between cells adjacent to the partition wall and has constricted communication pores of which a largest diameter Φ1 (μm) and a smallest diameter Φ2 (μm) satisfy relationships $\Phi1 \geq 50$ and $100 \times \Phi2/\Phi1 \leq 20$, the communication pores including the fine pores, and the proportion of the constricted communication pores in all the communication pores is 20% or more.

* * * * *